United States Patent [19]
Oetiker

[11] Patent Number: 5,138,747
[45] Date of Patent: Aug. 18, 1992

[54] CLAMP STRUCTURE WITH IMPOROVED SPRING ACTION

[76] Inventor: Hans Oetiker, Oberdorfstraase 21, CH-8812, Horgen, Switzerland

[21] Appl. No.: 681,893

[22] Filed: Apr. 8, 1991

[51] Int. Cl.$^5$ .............................................. B65D 63/02
[52] U.S. Cl. ............................... 24/20 R; 24/20 CW; 24/20 LS
[58] Field of Search ............ 24/20 R, 20 CW, 20 EE, 24/20 S, 20 LS, 20 TT, 20 W, 23 W, 23 EE

[56] References Cited

U.S. PATENT DOCUMENTS

| | | | |
|---|---|---|---|
| 2,405,912 | 8/1946 | Tinnerman | 24/20 TT |
| 3,295,176 | 1/1967 | Bright | 24/20 CW |
| 3,510,918 | 5/1970 | Oetiker . | |
| 4,299,012 | 11/1981 | Oetiker | 24/20 CW |
| 4,312,101 | 1/1982 | Oetiker | 24/20 R |
| 4,315,348 | 2/1982 | Oetiker | 24/20 CW |
| 4,430,775 | 2/1984 | Arthur | 24/20 EE |
| 4,497,090 | 2/1985 | Proctor | 24/20 R |
| 4,523,352 | 6/1985 | Wachter | 24/20 CW |
| 4,712,278 | 12/1987 | Oetiker | 24/20 TT |
| 4,742,600 | 5/1988 | Calmettes et al. | 24/20 EE |

FOREIGN PATENT DOCUMENTS

| | | | |
|---|---|---|---|
| 0680662 | 5/1930 | France | 24/20 R |
| 2553155 | 4/1985 | France | 24/20 S |

*Primary Examiner*—Victor N. Sakran
*Attorney, Agent, or Firm*—Paul M. Craig, Jr.

[57] ABSTRACT

An auxiliary spring structure for use with open clamps in which the auxiliary spring member is contained within a cage formed by the outer band portion whereby the free leg portions of the auxiliary spring member extend through slot-like openings in the cage to engage the latter from the outside so as to resist elastically forces seeking to enlarge the circumferential dimensions of the clamp. In another embodiment, the auxiliary spring structure is formed by one or preferably several interengaged leaf springs which are connected between the end area of the outer band portion and the clamping band near the beginning of the inner band portion. Any gaps resulting in the auxiliary spring structure are thereby covered by the full band width of the inner band portion. The auxiliary spring structure of this invention can be used with one-ear clamps, earless clamps and screw-type clamps.

49 Claims, 4 Drawing Sheets

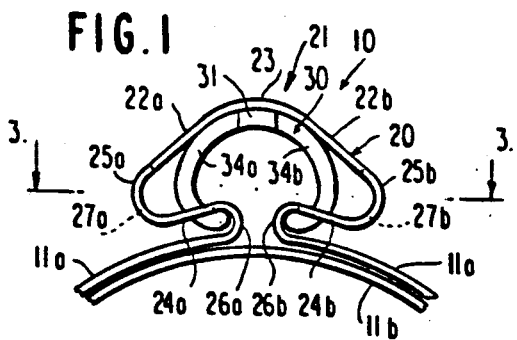
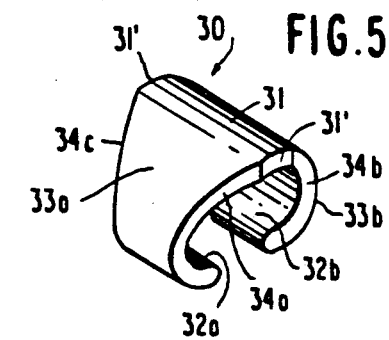
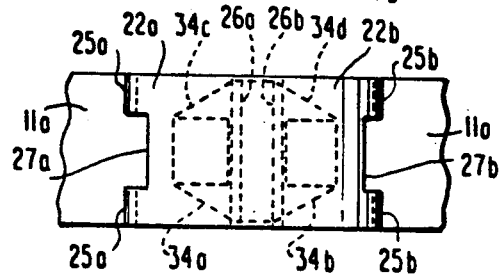
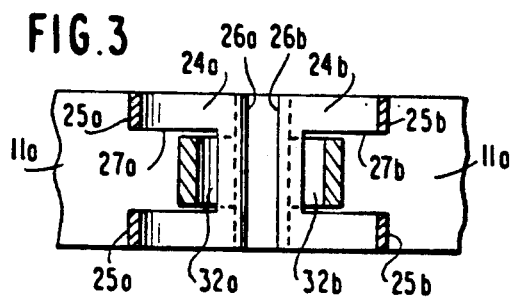
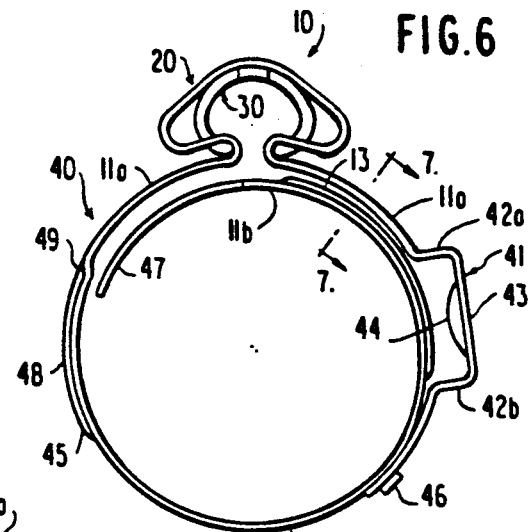
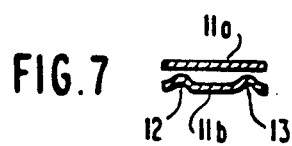
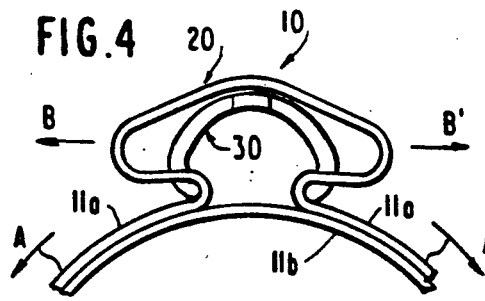
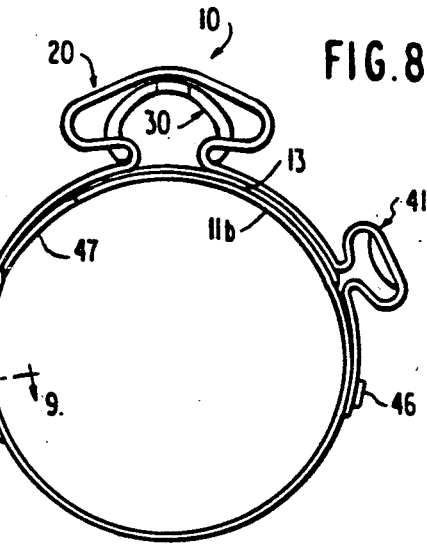
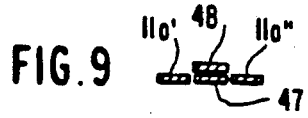

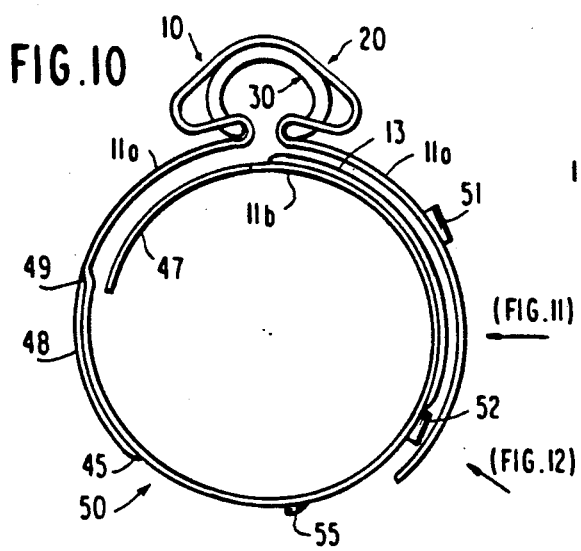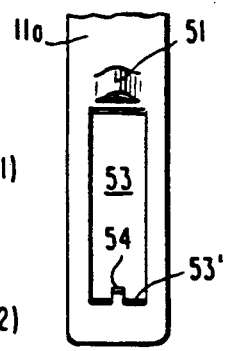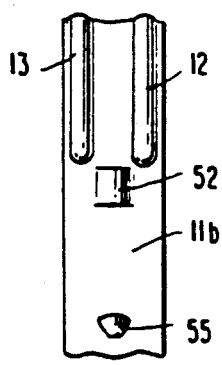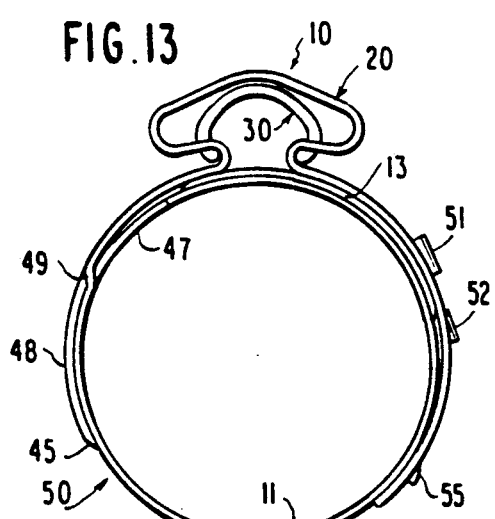

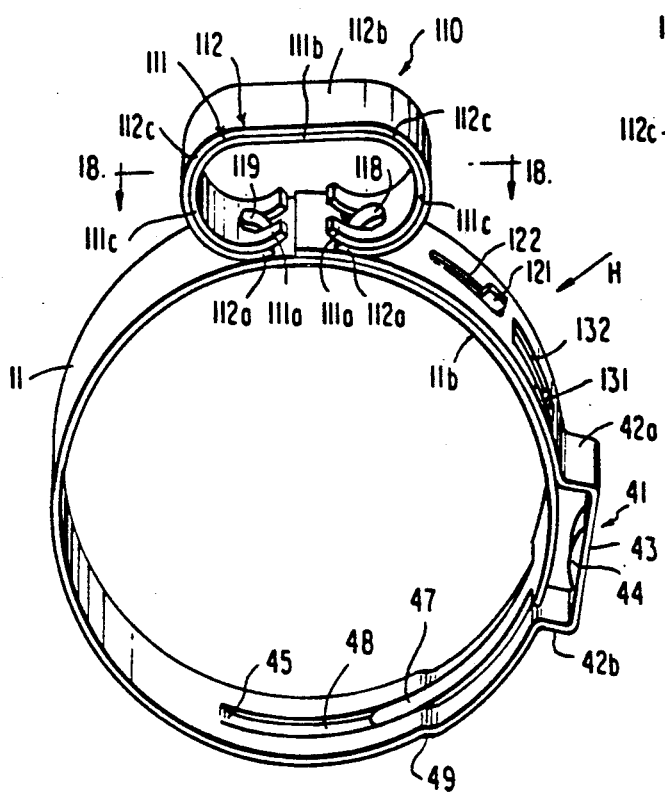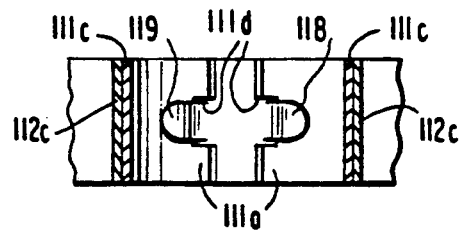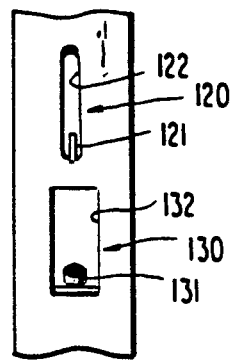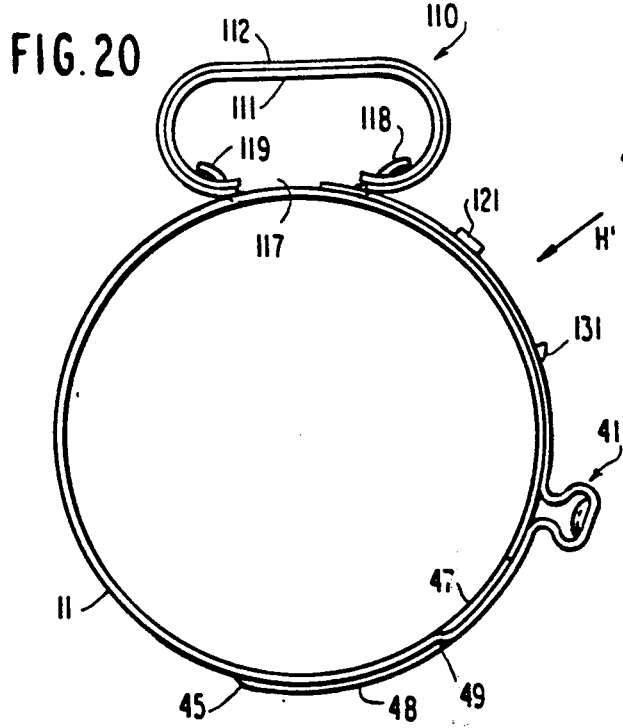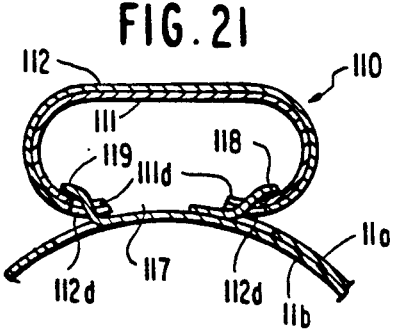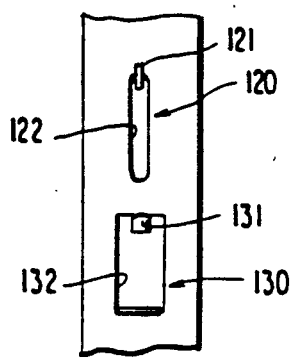

CLAMP STRUCTURE WITH IMPOROVED SPRING ACTION

FIELD OF INVENTION

The present invention relates to an open clamp and more particularly to an open clamp provided with an auxiliary spring structure and with an internal clamping surface devoid of any gaps, discontinuities or steps.

BACKGROUND OF THE INVENTION

Both closed clamps made from tubular stock as well as open clamps provided with mechanical interconnecting means, which utilized plastically deformable so-called "Oetiker" ears have proved immensely successful over more than three decades. My prior U.S. Pat. Nos. 2,614,304; 2,847,742; 3,082,498 and 3,402,436 are representative of some of the types of clamps which have been sold worldwide in large quantities. With the advent of new plastic, relatively harder hose materials, as used, for example, with axle boots, the need for an internal clamping surface devoid of any gaps, discontinuities or steps became imperative to assure complete tightening of the axle boot. Additionally, the mechanical connection used heretofore with open clamps and consisting of one or more substantially U-shaped members bent out of the material about an axis transverse to the longitudinal direction of the clamping band, as disclosed, for instance, in my prior U.S. Pat. No. 3,475,793, imposed limitations on the strength to resist opening forces, i.e., of holding together the overlapping band ends of open clamps, particularly when higher tightening forces are used. My prior U.S. Pat. No. 4,299,012; 4,315,348 and 4,622,720 disclose solutions which have also proved immensely successful in practice. Furthermore, the relatively narrow canoe-shaped reinforcing groove as proposed in my prior U.S. Pat. No. 3,475,793 has been vastly improved in the bridging portion of a so-called "Oetiker" ear by a relatively shallow depression of approximately rectangular configuration in plan view with the sides thereof extending at least over half the length and width of the bridging portion. The details of the improved reinforcing depression are disclosed in my copending application Ser. No. 06/622,764, the details of which are incorporated herein by reference. It is noted that the corresponding British application has issued as British Patent 2,160,577.

One of the reasons for the immense commercial success of my various clamp products is attributable to the particular features obtainable with the plastically deformable, so-called "Oetiker" ear which, when plastically deformed to tighten the clamp about the object to be fastened thereby, provides an automatic spring action to compensate for changes in temperature and/or pressure. This compensating action, however, is limited by the yield strength of the clamping band material of which the plastically deformable ear is also made. Once the elastic limit of the clamping band material is reached, the automatic spring action of the plastically deformed so-called "Oetiker" ear is jeopardized. In other words, the maximum spring path allowed by an "Oetiker" ear, i.e., the maximum increase in the circumferential dimension of the clamp, is limited by the elastic limit of the clamping band material. If this elastic limit is exceeded, for example, as a result of temperature increases in the cooling medium carried by a radiator hose, there exists a serious leakage problem when the cooling medium cools down again because the clamp will not elastically return to its original dimensions with the same clamping force.

These problems have been confronted by clamp structures in which the plastically deformed "Oetiker" ear was formed in a separate connecting member which could be made of a material having greater yield strength than the material of the clamping band. My prior U.S. Pat. No. 2,847,742 is representative of this approach. However, both from a cost point of view as well as from an installation point of view, it is desirable to make the plastically deformable ear integral with the clamping band.

My prior U.S. Pat. No. 3,475,793 proposed the use of tensional spring elements formed in the clamping band itself which was then made from appropriate spring steel material as contrasted to soft steel. If in addition to one or more tensional spring elements, also a plastically deformable "Oetiker" ear was desired in such open clamp, it became necessary to submit the clamping band to additional heat treatment in order to provide a plastically deformable material within the area of the "Oetiker" ear.

As hermetically sealed cooling systems in the automotive industry permit ever-increasing temperatures of the cooling fluid and as the new hose materials exhibit greater likelihood to change the external configuration within the area of the clamping band where grooves or indentations are formed, there exists a need for increasing the maximum spring path, i.e., provide greater elastic automatic compensation to maintain tightness of the hose connection.

The European Patent 0 280 598 already addressed this problem to establish an "elasticity reserve" by the use of a loop formed in the clamping band which is externally surrounded by a spring sleeve. To cover the gap underneath the loop and to limit the elastic deflection of the loop and its external cylindrical spring sleeve, a separate part is used which is installed so as to extend underneath the clamping band and over the spring sleeve. This arrangement requires a number of parts which increases the cost of manufacture and assembly and additionally requires a separate part to cover the gap underneath the loop. Furthermore, steps are formed at the point of mechanical connection between the inner and outer band portions.

SUMMARY OF THE INVENTION

The present invention has as a principal object to overcome the aforementioned shortcomings and drawbacks encountered with the prior art clamps and to provide an auxiliary spring structure which is simple to manufacture, easy to install and capable of being adapted to the exigencies of a given situation.

Another object of this invention resides in an open clamp provided with an auxiliary spring structure to increase the maximum spring path possible by the clamp and at the same time assures a completely satisfactory internal clamping surface devoid of any gaps, discontinuities or steps by extremely simple means.

In one embodiment, the underlying problems are solved according to the present invention in that a part of the clamping band is formed into a cage for a separate spring member which is retained within the cage in such a manner that forces seeking to increase the circumferential dimensions of the clamp are opposed by the auxiliary spring member within the cage.

According to another feature of the present invention, the auxiliary spring member which is of convex shape, extends with its narrowed leg portions through openings in the cage so that, though held within the cage, the leg portions of the auxiliary spring member engage inner parts of the cage from the outside thereof.

According to still another feature of the present invention, the gap underneath the cage is covered by the full band width of the inner band portion in such a manner that an internal clamping surface is assured devoid of any gaps, discontinuities or steps.

According to still another feature of the present invention, the auxiliary spring member may be constituted by a spring member made from appropriately selected spring material or may consist of a number of convexly shaped leaf springs to permit adaptation to the needs of a given situation.

According to still another feature of the present invention, friction is far-reachingly eliminated during sliding movement of the inner band portion relative to the outer band portion. This is achieved by spaced ribs along the outer surface of the inner band portion which extend over a predetermined circumferential distance of the inner band portion. As a result thereof, the friction forces which may occur, for example, during closing of an "Oetiker" ear in a one-ear clamp structure and/or during operation of the auxiliary spring structure, are far-reachingly minimized, thereby substantially improving performance of the clamp.

According to still another feature of the present invention, means may be provided in overlapping inner and outer band portions for limiting the extent of elastic deflection of the auxiliary spring structure. These means can be attained in a simple manner by one or more outwardly extending projections or hooks in the inner band portion adapted to engage in an oversize aperture or apertures in the outer band portion, the dimensions of which limit movement of the projection or hook in the presence of forces seeking to increase the circumferential dimensions of the clamp.

According to another embodiment in accordance with the present invention, the auxiliary spring structure may be formed by one or preferably several convexly shaped leaf spring members which are interconnected between the end area of the outer band portion and a corresponding part of the clamping band where it is about to pass over into the inner band portion. The mechanical connection of the auxiliary spring member is thereby achieved in a particularly simple manner by outwardly extending hooks in the outer band portion and adjacent clamping band portion forming the inner band portion whereby these hooks point in opposite direction and engage in corresponding apertures in the auxiliary spring member, respectively, in the several leaf spring elements thereof. In this manner, two important advantages are achieved. On the one hand, the ordinary mechanical connection between the outer and inner band portions is now taken over by the auxiliary spring structure which, by the use of appropriately designed hooks in conjunction with appropriately shaped inner ends of the leaf spring members, can be made to withstand considerable tensional forces in the circumferential direction. At the same time, the gap underneath the convexly shaped auxiliary spring member is automatically covered by the full width of the clamping band.

Anti-friction ribs and/or limiting means to limit the elastic stretching of the auxiliary spring member may also be readily incorporated in this embodiment.

Another important feature of the auxiliary spring structure of the present invention is its universal applicability to different types of open clamps. The auxiliary spring structure in accordance with the present invention may be used, for example, with so-called one-ear clamps, so-called earless clamps and/or so-called screw-type clamps whereby an internal clamping surface devoid of any gaps, discontinuities or steps can be assured by extremely simple means.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 1 is an elevational view taken in the axial direction of a partially shown open clamp, of an auxiliary spring structure in accordance with the present invention which includes a cage to accommodate a separate spring member;

FIG. 2 is a partial top plan view on FIG. 1;

FIG. 3 is a cross-sectional view taken along line 3—3 of FIG. 1;

FIG. 4 is an elevational view, similar to FIG. 1, and illustrating the auxiliary spring structure under the influence of forces seeking to increase the diameter of the clamp;

FIG. 5 is a perspective view of the auxiliary spring used in the embodiment of FIGS. 1-4;

FIG. 6 is an elevational view of a one-ear clamp with an auxiliary spring structure in accordance with the present invention;

FIG. 7 is a cross-sectional view, taken along line 7—7 of FIG. 6;

FIG. 8 is an elevational view, similar to FIG. 6, and illustrating the installed clamp under the influence of forces seeking to enlarge the circumference of the clamp;

FIG. 9 is a cross-sectional view, taken along line 9—9 of FIG. 8;

FIG. 10 is an elevational view of a so-called earless clamp provided with an auxiliary spring structure in accordance with the present invention;

FIG. 11 is a partial top plan view on the end area of the outer band portion of the clamp of FIG. 10;

FIG. 12 is a partial top plan view on the inner band portion of the clamp of FIG. 10;

FIG. 13 is an elevational view, similar to FIG. 10, illustrating the installed earless clamp of FIG. 10 under the influence of forces seeking to increase the circumferential dimensions of the clamp;

FIG. 14 is a right side elevational view of the clamp shown in FIG. 13;

FIG. 15 is an elevational view illustrating a so-called screw-type clamp with an auxiliary spring structure in accordance with the present invention, illustrating the parts thereof in the non-installed condition;

FIG. 16 is an elevational view, similar to FIG. 15, of a modified embodiment of a screw-type clamp and showing the parts thereof in the installed condition of the clamp under the influence of forces seeking to expand the circumferential dimensions of the clamp;

FIG. 17 is a perspective view of a one-ear clamp with a modified embodiment of an auxiliary spring structure in accordance with the present invention;

FIG. 18 is a cross-sectional view, taken along line 18—18 of FIG. 17;

FIG. 19 is a partial plan view on the clamp illustrated in FIG. 17 within the area of the arrow H;

FIG. 20 is an elevational view, illustrating the clamp of FIG. 17 in the installed condition and under the influence seeking to increase the circumferential dimensions of the clamp;

FIG. 21 is a partial cross-sectional view in a plane containing the auxiliary spring structure 110 and transverse to the axis of the clamp, illustrating the parts in their condition under the influence of forces seeking to increase the circumferential dimensions of the clamp;

FIG. 22 is a partial plan view in the direction of arrow H' and showing the parts in the position of maximum stretching of the auxiliary spring structure.

DETAILED DESCRIPTION OF THE DRAWINGS

Figure 23:
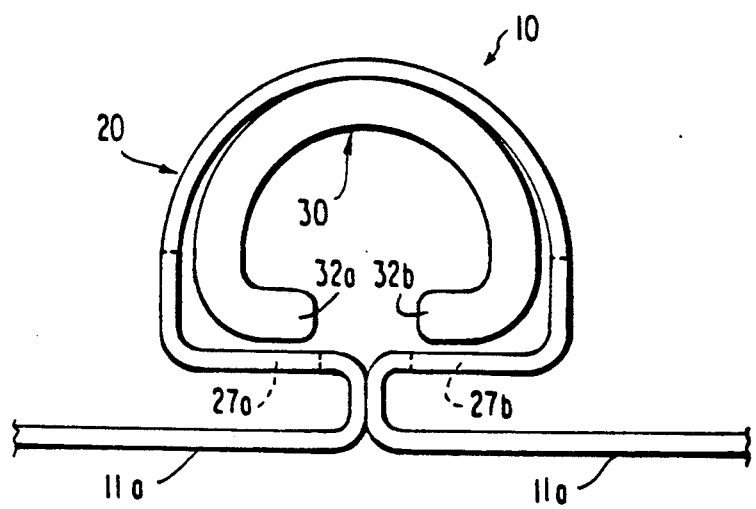
FIG. 23 is a somewhat schematic partial elevational view showing the cage and auxiliary spring of the embodiment of FIGS. 1-5 in the position prior to deformation of the cage.

Referring now to the drawing wherein like reference numerals are used throughout the various views to designate corresponding parts, and more particularly to FIGS. 1-5, the auxiliary spring structure generally designated by reference numeral 10 includes a cage generally designated by reference numeral 20 which is formed integral with the outer clamping band portions 11a. The cage 20 has a roof-like top portion 21 which includes substantially rectilinear side portions 22a and 22b interconnected by a convexly shaped crown portion 23. The substantially rectilinear side portions 22a and 22b are connected with the substantially rectilinear bent-back portions 24a and 24b by way of convexly shaped connecting portions 25a and 25b. The bent-back portions 24a and 24b pass over into the outer band portions 11a by way of concavely shaped connecting portions 26a and 26b. The radii of curvature of the convexly shaped connecting portions 25a and 25b are thereby smaller than the radii of curvature of the convexly shaped crown portion 23 and the radii of curvature of the concavely shaped connecting portions 26a and 26b are thereby smaller than the radii of curvature of the convexly shaped connecting portions 25a and 25b. Substantially rectangular slot-like openings 27a and 27b are provided in the cage 20 and start from the area of transition from the rectilinear side portions 22a and 22b into the convexly shaped connecting portions 25a and 25b and extend to within the area of transition from the bent-back portions 24a and 24b into the concavely shaped connecting portions 26a and 26b.

The convexly shaped auxiliary spring 30 whose crown portion 31 has a width substantially equal to that of the clamping band includes a pair of spaced leg portions 32a and 32b of substantially constant width whereby the width of the spaced leg portions 32a and 32b is less than the width of the slot-like openings 27a and 27b (FIG. 3). The spaced leg portions 32a and 32b are connected with the convexly shaped crown portion 32 by way of tapering portions 33a and 33b whose tapering sides are indicated in FIGS. 2 and 5 by reference numerals 34a, 34b, 34c and 34d. The outer faces of the crown portion 31 which extend parallel to the outer surfaces of the crown portion 23 are indicated in FIG. 5 by 31'. Though the auxiliary spring member 30 is accommodated inside of the cage 20, its leg portions 32a and 32b extend through the slot-like openings 27a and 27b in order to engage the concavely shaped connecting portions 26a and 26b from the outside of the cage. In the presence of forces A and A' (FIG. 4) seeking to increase the circumferential dimensions of the clamp, the parts of the auxiliary spring structure will tend to assume positions indicated in FIG. 4 where the forces seeking to deform the auxiliary clamp structure are indicated by arrows B and B'.

Though the auxiliary spring member 30 is shown in the embodiment of FIGS. 1-5 as made from solid spring material such as spring steel, selected as to spring characteristics and thickness in dependence on the operating conditions for which the clamp is designed, it is understood that the auxiliary spring member 30 may also be formed of preferably several leaf springs in stacked inter-engagement such that at least the leg portions are in mutual engagement to reinforce one another as is known in connection with packets of leaf springs.

Another feature of the auxiliary spring illustrated in FIGS. 1-5 is the fact that the gap formed in the outer band portion 11a underneath the cage 20 can be bridged by the full band width of the inner band portion 11b.

The auxiliary spring member 30 is thereby installed into the non-deformed cage 20 whereupon the cage 20 is deformed until the leg portions 32a and 32b can extend through the slot-like openings 27a and 27b to engage with the concavely shaped connecting portions 26a and 26b from the outside of the cage. This can be achieved by the use of any known appropriate tools, such as pincer-like tools or any other deformation tools. One way of achieving the deformation of the cage with installed auxiliary spring member will be described by reference to FIG. 23.

FIGS. 6 through 9 illustrate the application of the auxiliary spring structure of FIGS. 1 through 5 to a so-called one-ear clamp devoid of any gaps, discontinuities or steps in the internal clamping surface of the type described in my prior U.S. Pat. No. 4,299,012. The clamping band 11 again includes in its outer band portion an auxiliary spring structure 10 of the type shown in FIGS. 1 through 5 which is followed in the outer band portion 11a by a plastically deformable so-called "Oetiker" ear generally designated by reference numeral 41 and including generally outwardly extending leg portions 42a and 42b interconnected by a bridging portion 43 which is provided with a reinforcement 44, preferably with a relatively shallow, generally pan-shaped depression of substantially rectangular configuration as viewed in plan view, as more fully described in my aforementioned copending application Ser. No. 06/622,764. The L inner and outer band portions 11b and 11a are mechanically interconnected by any conventional means schematically indicated by hook 46 extending outwardly from the inner band portion 11b and engaging in a corresponding aperture provided in the outer band portion 11a. The mechanical connection between the inner and outer band portions may thereby be of any known type, for example, a riveted connection as disclosed in my prior U.S. Pat. No. 3,082,498, or may be a connection including one guide hook and one or more support hooks as disclosed in my prior U.S. Pat. No. 4,299,012 or may be a connection including one or more support hooks in conjunction with a combined guide and support hook as disclosed in my prior U.S. Pat. No. 4,622,720 or may be a connection utilizing only a combined guide and support hook of the type disclosed in my prior U.S. Pat. No. 4,622,720. Additionally, the mechanical connection indicated by hook 46 may in certain circumstances also be a welded connection.

In order to achieve an internal clamping surface devoid of any gap, discontinuity or step, the inner band portion 11b is provided with a tongue portion 47 adapted to engage in a centrally located pressed-out channel 48 leaving lateral band portions 11a' and 11a" on both sides of the pressed-out tongue-receiving channel 48 (FIG. 9). The pressed-out tongue-receiving channel 48 thereby commences within the area of a first step-like portion 49, raising the lateral band portions 11a' and 11a" to the height of the channel and terminates within the area of a second step-like portion 45 spaced in the direction of the tongue portion 47 from the first step-like portion 49, i.e., in a direction away from the auxiliary spring structure 10. These means 45, 47, 48 and 49 to provide an internal clamping surface devoid of any gaps, discontinuities or steps are of the type more fully described in my prior U.S. Pat. No. 4,299,012.

In order to minimize friction during closing of the ear-like structure 41 and to permit the auxiliary spring structure to operate with a minimum of friction resulting in overlapping band areas, the inner band portion 11b is provided with pressed-out ribs 12 and 13 spaced from each other and located near the outer end areas of the clamping band, as viewed in transverse cross section (FIG. 7). These ribs 12 and 13 are thereby so constructed as to minimize friction during relative movements of overlapping band portions by the use of rounded-off tips having a relatively small radius of curvature, determined by the size of the ribs. These ribs 12 and 13 thereby extend over such a circumferential extent from an area between the mechanical connection 46 and the ear 41 to the area beyond the auxiliary spring structure 10 near the point where the tongue portion commences so that in the installed condition of the clamp, the gaps underneath the ear-like structure 41 and the auxiliary spring structure 10 are covered by the full band width of the inner band portion 11b. It can thus be seen from FIGS. 6 through 9 that a clamp with a plastically deformable ear 41 as well as with an auxiliary spring structure 10 increasing the maximum spring path is obtained in which the inner clamping surface is devoid of any gap, discontinuity or step. This clamp structure can be made in a relatively simple, cost-efficient manner by stamping out the flat clamping band, inserting the auxiliary spring into the cage and deforming the cage as described above whereupon the one-ear clamp is ready for installation and plastic deformation of its ear-like structure during tightening of the clamp over the object to be fastened thereby. The clamp illustrated in FIGS. 6 through 9 requires only two separate parts which are already preassembled at the place of manufacture so as to be ready for use in installing the clamp over the object to be fastened thereby and tightening the clamp.

Though FIGS. 6 through 9 illustrate an embodiment in which a single ear-like structure is used. It is understood that the present invention can also be used with clamps having more than one ear-like structure.

FIGS. 10 through 14 illustrate the application of the auxiliary spring structure illustrated in FIGS. 1 through 5 to a so-called earless clamp of the type disclosed in my prior U.S. Pat. No. 4,492,004. Similar reference numerals are used in this embodiment to designate similar parts of the embodiment of FIGS. 6 through 9.

The so-called earless clamp generally designated by reference numeral 50 thereby includes a tool-engaging embossment 51 in the outer band portion 11a (FIG. 11) and a tool-engaging embossment 52 in the inner band portion (FIG. 12). These tool-engaging embossments are thereby provided with tool-engaging surfaces 51' and 52' and are, as disclosed in my prior U.S. Pat. No. 4,492,004 of semi-circular configuration, integral with the clamping band in the circumferential direction so as to impart substantial strength during application of the tightening forces. The tool-engaging embossment 52 is thereby made of smaller dimensions than the tool-engaging surface 51 in order to be able for the former to extend underneath the latter in the installed condition of the clamp. However, they may also be of substantially similar size if an arrangement is used as shown in FIGS. 10 through 14 where the tool-engaging embossment 52 in the inner band portion extends through a substantially rectangular opening 53 in the outer band portion and in the installed position of the clamp assumes the position shown in FIG. 14 in which the outwardly extending hook 55 in the inner band portion engages with and extends over the central projection 54 provided in the end face 53' of the opening 53. FIG. 11 thereby illustrates the outer clamp end portion as viewed in the direction of arrow (FIG. 11) while FIG. 12 illustrates a plan view of the inner band portion as viewed in the direction of arrow (FIG. 12) with the outer band portion removed. FIG. 12 thereby also illustrates the pressed-out anti-friction ribs 12 and 13 which extend in the inner band portion from the tool-engaging embossment 52 to an area where the tongue portion commences. The means 45, 47, 48 and 49 providing an inner clamping surface devoid of any gaps, discontinuities or steps are similar to those of the embodiment of FIGS. 6 through 9.

In lieu of tool-engaging embossments as shown in FIGS. 10 through 14, the tool-engaging surfaces may also be formed by a cold-deformed embossment in the outer band portion and two pressed-out tab-like members in the inner band portion as described in my prior U.S. Pat. No. 4,712,278.

To install the clamp over an object to be fastened thereby, the clamp is tightened by the application of tightening forces by means of pincer-like tools, as known in the art, at the tool-engaging surfaces 51' and 52' until the cold-deformed hook 55 engages with the projection 54 located in the transverse end surface 53' of the rectangular opening 53 provided in the outer band portion 11a. FIG. 14 illustrates the various parts of the earless clamp in the installed condition as shown in FIG. 13 in which the various parts thereof are shown under the influence of forces seeking to enlarge the circumferential dimension of the clamp. The two spaced, pressed-out anti-friction ribs 12 and 13 are shown in FIG. 12, whereby an internal clamping surface devoid of any gap, discontinuity or step is attained again by the tongue portion 47 engaging in the tongue-receiving channel 48 commencing and terminating within the areas of the step-like portions 49 and 45.

The use of the auxiliary spring structure 10, however, is not limited to the earless clamp illustrated in FIGS. 10–14 but is equally applicable to earless structures as disclosed in my prior U.S. Pat. Nos. 4,492,004; 4,712,278 and 4,987,651 or any combination of features thereof. Additionally, the various parts, such as the location of the tool-engaging embossments 51 and 52 may also be modified so as to correspond more closely to the structural details as shown in my prior U.S. Pat. No. 4,492,004, whereby the pre-assembly hook of the latter may also be modified to form a snap-in type preassembly hook as disclosed in my copending application Ser. No. 06/942,694, entitled "Clamp Structure With Preassembly Arrangement" and filed in the U.S. Patent and Trademark Office on Dec. 22, 1986, the subject matter of which is incorporated herein by reference.

It should be noted again that the gap underneath the auxiliary spring structure is covered by the full band width of the inner band portion 11b, the same being true of the rectangular opening 53 in the outer band portion 11a.

FIGS. 15 and 16 illustrate the use of the auxiliary spring structure 10 shown in FIGS. 1-5 in conjunction with a so-called screw-type clamp s illustrated in my prior U.S. Pat. No. 4,521,940. Similar parts are again designated in FIGS. 15 and 16 by similar reference numerals as used in FIGS. 1-14. Differing from the embodiments of FIGS. 6-9 and 10-14, the screw-type clamp of FIGS. 15 and 16 includes a screw member generally designated by reference numeral 70 for tightening the clamp about the object to be fastened thereby. The outer ban portion 11a with which the auxiliary spring structure 10 is again integrally formed, is thereby bent back upon itself in its section 11a', thereby forming a loop-like pocket 61 to receive the at least part-cylindrical band-tightening member 62 which is provided with a threaded bore (not shown) for threaded engagement with the shank 71 of the screw member 70. The bent-back outer band section 11a' is thereby mechanically connected with the underlying outer band portion 11a by any known means schematically indicated by a hook 46 punched out to the underlying outer band portion 11a and extending through a corresponding aperture in the outer band portion section 11a'. This mechanical connection between the outer band portion 11a and the bent-back outer band section 11a' may take place by any known means, such as a rivet-like connection, a welded connection or the use of the one or more outwardly extending hooks of any known type. A separate band part generally designated by reference numeral 65 includes an inner band portion 65a and a bent-back band portion 65b forming there between a loop-like pocket 66 to receive the at least part cylindrically shaped band-tightening member 67 which is provided with a non-threaded bore through which extends the shank 71 of the screw member 70. The band portions 65a and 65b are thereby mechanically connected to the clamping band 11 by any conventional means, again schematically indicated by hook 46 which schematically represents any known mechanical connection such as a rivet-like connection, welded connection or connection by the use of one or several outwardly extending hooks from the clamping band 11 engaging into corresponding apertures in the band portions 65a and 65b. It is also possible to interconnect separately the camping band portions 65a and 65b by any known means and to then interconnect the clamping band portion 65a with the clamping band 11, as also disclosed in my prior U.S. Pat. No. 4,521,940.

FIGS. 15 and 16 differ from each other in that in FIG. 15 the sleeve 68 is directly interposed between the screw head 69 and the part cylindrically shaped member 67 while in the embodiment of FIG. 16 a spring 75 is interposed between the screw head 69 and the sleeve member 68 to provide additional spring action. FIG. 15 thereby shows the screw-type clamp is the non-installed condition while FIG. 16 illustrates the screw-type clamp in the installed condition under the influence of forces seeking to increase the circumferential dimensions of the clamp. The embodiments of FIGS. 15 and 16 also include the tongue portion 47 adapted to engage in the tongue-receiving channel 48 to form an internal clamping surface devoid of any gap, discontinuity or step as described in connection with the embodiments of FIGS. 6-9 and 10-14 as well as two pressed-out anti-friction ribs 12 and 13 extending within the area of overlap, as shown in FIGS. 15 and 16. As to the rest, what was said in connection with the embodiments of FIGS. 6-9 and 10-14 applies also analogously to the embodiment of FIGS. 15 and 16.

FIGS. 17-22 illustrate a modified embodiment of an auxiliary spring structure generally designated by reference numeral 110 which includes a number of convexly shaped leaf spring members 111 and 112 having a width corresponding substantially to the width of the clamping band and being of approximately omega shape. The leaf spring members 111 and 112 have a more or less flat top portion 111b and 112b passing over into convexly shaped side portions 111c and 112c which terminate in spaced end portions 111a and 112a. The spaced inner end portions 11a and 112a of the leaf spring members 111 and 112 are thereby bent so as to point in the direction toward the substantially rectilinear top portions 111b and 112b.

The end area of the outer band portion 11a is provided with a substantially S-shaped hook 118 adapted to engage in apertures 111d and 112d (FIG. 21) provided in the right inner end portions 111a and 112a of the leaf spring members 111 and 112 while a substantially S-shaped hook 119 in the clamping band 11 where it si just about to pass over into the inner band portion 11b is adapted to engage in corresponding apertures 111d and 112d provided in the left inner end portions 111a and 112a of the leaf spring members 111 and 112. The hooks 118 and 119 which point in opposite direction away from each other in conjunction with the apertures 111d and 112d which are open from the ends of the inner end portions 111a and 112a, thereby take over the mechanical interconnection between the inner and outer band portions 11b and 11a whereby the gap 117 underneath the leaf spring members 111 and 112 is again covered by the full bend width of the clamping band. The inner and outer band portions 11b and 11a are also provided with means generally designated by reference numeral 120 and reference numeral 130 for limiting the elastic deformation of the auxiliary spring structure 110. The limiting means 120 and 130 include a hook 121, respectively, 131 extending outwardly from the inner band portion 11b and adapted to engage in an oversize aperture 122, respectively, 132 provided in the outer band portion 11a so that the oversize apertures 122 and 132 determine the extent of relative movement of the inner and outer bend portions 11b and 11a and therewith the extent to which the auxiliary spring structure 110 can be subjected to stretching forces.

The inner band portion 11a may again be provided with anti-friction ribs 12 and 13 as described above.

The inner clamping surface devoid of any gaps, discontinuities or steps is again achieved by the use of a tongue portion 47 adapted to engage in a tongue-receiving channel 48 staring from a first step-like portion 49 and terminating in the second step-like portion 45.

What was said in connection with the embodiments of FIGS. 6–9, 10–14, 15 and 16 applies analogously to the embodiment of FIGS. 17–22.

It is also understood that the means 120, 130 described in connection with the embodiment of FIGS. 16–22 is also utilizable in connection with the other embodiments of FIGS. 6 through 16.

FIG. 23 illustrates a preferred manner of installing the auxiliary spring member 30 into the cage 20 and deforming the later into shape as shown in FIGS. 1 through 4. The cage 20 in FIG. 23 thereby has the shape as shown in this figure when the clamping band is punched out from a flat band and already includes rounded-off sections to form ultimately the convexly shaped connecting portions 25a and 25b and the concavely shaped connecting portions 26a and 26b. The auxiliary spring member 30 also has the shape as shown in FIG. 23. As soon as the spring member 30 is inserted laterally, the cage 20 is deformed by application of pressure from above while the flat blank is supported on the inside. The leg portions 32a and 32b are thereby guided through the two slot-like openings 27a and 27b until they abut externally on the clamping band and a further deformation of the cage is no longer possible. This is the condition illustrated in FIG. 1.

While I have shown and described several embodiments in accordance with the present invention, it is understood that the same is not limited thereto but is susceptible of numerous changes and modifications as known to those skilled in the art. More specifically, the present invention may be modified as indicated in my various prior art patents in conjunction with which the auxiliary spring structure can be used, whereby the clamps themselves can be modified as disclosed in these patents.

It is also understood that the auxiliary spring structure in accordance with the present invention may be used with an open clamp having more than one so-called "Oetiker" ear is also with any other type of so-called "STEPLESS" clamps.

I therefore do not wish to be limited to the details shown and described herein but intend to cover all such changes and modifications as are encompassed by the scope of the appended claims.

I claim:

1. An open clamp which includes a clamping band means with overlapping band portions and with further means for connecting overlapping band portions, respectively, tightening the clamp about an object to be fastened thereby, characterized by an auxiliary spring structure to increase the maximum spring path of the clamp, including a cage means formed in the clamping band means, said cage means being of such shape and being so interconnected in said clamping band means as to pen up in the presence of forces seeking to enlarge the diametric dimension of the clamp, and separate auxiliary spring means within the cage means and operable to oppose by its inherent spring characteristics opening of the cage means in the presence of forces seeking to enlarge the diameter of the clamp.

2. An open clamp according to claim 1, characterized in that overlapping inner and outer band portions include additional means to provide an internal clamping surface devoid over its entire circumference of any gap, step or discontinuity.

3. An open clamp according to claim 2, characterized in that the further means includes a plastically deformable ear-like means including two generally outwardly extending leg portions connected by a bridging portion, and in that the ear-like means is located spaced in the circumferential direction from said cage-like means opposite to said additional means so that the gap underneath the earlike means is covered by the full band width of the inner band portion.

4. An open clamp according to claim 3, characterized in that the bridging portion is provided with reinforcing means formed by a shallow depression of approximately rectangular shape as viewed in plan view, whose sides extend over at least half the length and width of the length and width of said bridging portion.

5. An open clamp according to claim 4, characterized in that the further mean includes at least one support hook means extending outwardly from the inner band portion and adapted to engage in a corresponding aperture means provided within the end are of the outer band portion.

6. An open clamp according to claim 5, characterized in that the inner band portion is provided with two circumferential extending pressed-out rib-like means within the area of the auxiliary spring structure and of the ear-like means to reduce the resulting friction forces during plastic deformation of the ear-like means and permit operation of the auxiliary spring structure with a minimum in friction in the installed condition of the clamp.

7. An open clamp of the earless type according to claim 2, characterized in that as part of the further means, the outer and inner band portions are each provided with tool-engaging means integral with the inner and outer band portions to enable tightening of the clamp over an object to be fastened thereby, the tool-engaging means in the inner band portion extending through an elongated opening in the outer band portion, and in that the inner and outer band portions are provided with connecting means to retain the inner and outer band portions in their relative position when the clamp is installed in tightened condition about the object to be fastened thereby.

8. An open clamp according to claim 7, characterized in that the too-engaging means extend in the longitudinal direction of the clamping band means and are integral with the clamping band means in said longitudinal direction.

9. An open clamp of the screw-type according to claim 2, characterized in that as part of the further means the end area of the outer band portion is bent back upon itself to form a first loop-like pocket, another part of the clamping band means being also bent back upon itself to form a second loop-like pocket, at least partially cylindrically shaped band-tightening pivot members in said first and second pockets; a threaded member extending through a non-threaded bore in one pivot member and threadably engaging with a threaded bore in the other pivot member to enable tightening of the clamp, and mechanical connecting means for connecting together the bent-back outer band portion with the underlying outer band portion and for connecting the overlapping portions of the another clamping band part with each other and with the clamping band means.

10. An open clamp according to claim 9, characterized in that the another part is a separate clamping band part.

11. An open clamp according to claim 10, characterized by further spring means interposed between said one pivot member and an abutment on the threaded member and operable to elastically oppose opening of the clamp.

12. An open clamp according to claim 2, characterized in that the additional means includes a tongue-like portion at the inner and portion, and tongue-receiving means in the overlapping outer band portion which is adapted to receive the tongue-like portion when the camp is installed over the object to be fastened thereby, and in that the tongue-receiving means commences within the area of an outwardly directed first step-like portion and extends from the first step-like portion in the same circumferential direction as the tongue-like portion.

13. An open clamp according to claim 12, characterized in that the tongue-receiving means includes a pressed-out channel in the center area of the overlapping outer band portion leaving non-pressed-out lateral band portions on both sides thereof, said lateral band portions being raised substantially to the height of the channel within the area of the first step-like portion, and said channel terminating within the area of a second step-like portion spaced in the circumferential direction away from said cage means.

14. An open clamp according to claim 12, characterized in that the tongue-receiving means includes an aperture means in the overlapping outer band portion commencing within the area of the first step-like portion and extending in the circumferential direction away from said cage means.

15. An open clamp according to claim 12, characterized in that the cage means forms a gap in the circumferential direction which is bridged by the full band width of the inner band portion.

16. An open clamp according to claim 1, characterized in that the cage means forms a gap in the circumferential direction, in that the gap is covered by the full width band of the inner band portion, and in that additional means are provided to effect an internal clamping surface devoid of any gap, step or discontinuity which includes tongue-like means and tongue-receiving means in overlapping band portions.

17. An open clamp according to claim 1, characterized in that the cage means has a roof-like top portion in engagement with the rounded top surface of the auxiliary spring means.

18. An open clamp according to claim 17, characterized in that the roof-like top portion of the cage means includes substantially rectilinear side portions interconnected by a convexly shaped crown portion and extending in opposite directions from said crown portion, said side portions terminating in at least approximately rectilinear bent-back portions by way of convexly shaped connecting portions, and said bent-back portions passing over into the clamping band means by concavely shaped connecting portions.

19. An open clamp according to claim 18, characterized in that the radii of curvature of the convexly shaped connecting portions are smaller than the radius of curvature of the convexly shaped crown portion, and that the radii of curvature of the concavely shaped connecting portions are smaller than those of the convexly shaped connecting portions.

20. An open clamp according to claim 18, characterized in that the auxiliary spring means is generally convexly shaped and has spaced leg portions having a width in their end areas less than the width of the clamping band means, and in that the cage means is provided with slot-like openings of a width at least equal to the width of the end areas of auxiliary spring leg portions so that the auxiliary spring means can extend with the end areas of its leg portions through the slot-like openings and thereby engage the cage means from the outside to elastically oppose an increase of the gap underneath the cage means in the presence of forces seeking to enlarge the diameter of the installed clamp.

21. An open clamp according to claim 20, characterized in that the slot-like openings extend from the areas where the side portions pass over into the convexly shaped connecting portions to the areas where the bent-back portions pass over into the concavely shaped connecting portions.

22. An open clamp according to claim 21, characterized in that the end areas of the leg portions of the convexly shaped auxiliary spring means are curved so as to extend generally toward one another and engage with their free ends from the outside at the concavely shaped connecting portions connecting the cage means with the clamping band means.

23. An open clamp structure according to claim 20, characterized in that the convexly shaped auxiliary spring means has a width in its top portion corresponding substantially to the width of the clamping band means and tapers from the top to the narrower width of the end areas of its leg portions.

24. An open clamp according to claim 20, characterized in that the auxiliary spring means is made of solid spring material.

25. An open clamp according to claim 20, characterized in that the auxiliary spring means is made from a number of interengaging leaf spring members.

26. An open clamp according to claim 20, characterized in that overlapping inner and outer band portions include additional means to provide an internal clamping surface devoid over its entire circumference of any gap, step or discontinuity with the full band width of the inner band portion covering any gap.

27. An open clamp according to claim 26, characterized in that the additional means includes a tongue-like portion at the inner band portion, and tongue-receiving means in the overlapping outer band portion which is adapted to receive the tongue-like portion when the clamp is installed over the object to be fastened thereby, and in that the tongue-receiving means commences within the area of an outwardly directed first step-like portion and extends from the first step-like portion in the same circumferential direction as the tongue-like portion.

28. An open camp according to claim 20, characterized in that the further means includes plastically deformable ear-like means including two generally outwardly extending leg portions connected by a bridging portion, and in that the ear-like means is located spaced in the circumferential direction from said cage-like means opposite to said additional means so that the gap underneath the ear-like means is covered by the full band width of the inner band portion.

29. An open clamp according to claim 28, characterized in that the inner band portion is provided with two circumferentially extending pressed-out rib-like means within the area of the auxiliary spring structure and of the ear-like means to reduce the resulting friction forces during plastic deformation of the ear-like means and permit operation of the auxiliary spring structure with a minimum in friction in the installed condition of the clamp.

30. An open clamp of the earless type according to claim 20, characterized in that as part of the further means, the outer and inner band portions are each provided with tool-engaging mean integral with the inner and outer band portions to enable tightening of the clamp over an object to be fastened thereby, the tool-engaging means in the inner band portion extending through an elongated opening in the outer band portion, and in that the inner and outer band portions are provided with connection means to retain the inner and outer band portions in their relative position when the clamp is installed in tightened condition about the object to be fastened thereby.

31. An open clamp according to claim 30, characterized in that the inner band portion is provided with two circumferentially extending pressed-out rib-like means within the area of the auxiliary spring structure and of the further means to reduce the resulting friction forces during plastic deformation of the ear-like means and permit operation of the auxiliary spring structure with a minimum in friction in the installed condition of the clamp.

32. An open clamp of the screw-type according to claim 20, characterized in that as part of the further means, the end area of the outer band portion is bent back upon itself to form a first loop-like pocket, another part of the clamping band means being also bent back upon itself to form a second loop-like pocket, at least partially cylindrically shaped band-tightening pivot members in said first and second pockets, a threaded member extending through a non-threaded bore in one pivot member and threadably engaging with a threaded bore in the other pivot member to enable tightening of the clamp, and mechanical connecting means for connecting together the bent-back outer band portion with the underlying outer band portion and for connecting the overlapping portions of the another clamping band part with each other and with the clamping band means.

33. An open clamp according to claim 32, characterized in that the another part is a separate clamping band part.

34. An open clamp according to claim 32, characterized in that the inner band portion is provided with two circumferentially extending pressed-out rib-like means within the area of the auxiliary spring structure and of the further means to permit operation of the auxiliary spring structure with a minimum in friction in the installed condition of the clamp.

35. An open clamp which includes clamping band means with overlapping band portions and with an internal clamping surface devoid of any gaps, steps or discontinuities, and further means for connecting overlapping band portions, respectively, tightening the clamp about an object to be fastened thereby, characterized by an auxiliary spring structure separate from the clamping band means and operable to provide predetermined elastic retightening forces in the presence of forces seeking to increase the diametric dimension of the clamp, said auxiliary spring structure being of at least part convexly shaped configuration and having inwardly directed spaced leg portions forming a gap, said auxiliary spring structure being in operative engagement with the clamping band means primarily at said leg portions in such a manner that any increase in the gap by forces seeking to increase the diametric dimension of the clamp is opposed by the inherent spring characteristics of the auxiliary spring structure, and additional means eliminating any gap, discontinuity or step in the internal clamping surface in such a manner that the gap of the auxiliary spring structure is bridged by the full band width of a part of the clamping band means itself.

36. An open clamp according to claim 35, characterized in that the additional means includes a tongue-like portion at the inner band end and a tongue-receiving means in the outer band portion.

37. An open clamp structure according to claim 36, characterized in that the further means includes a plastically deformable ear-like means having two generally outwardly extending leg portions interconnected by a bridging portion provided with reinforcing means.

38. An open clamp structure according to claim 37, characterized in that, as viewed in the circumferential direction, the auxiliary spring structure is followed by the ear-like means which, in turn, is followed by the additional means so that the gap underneath the ear-like means is also covered by the full band width of the inner band portion.

39. An open clamp structure according to claim 38, characterized by limiting means in the overlapping band portions within the arc between the auxiliary spring structure and the ear-like means for protecting the auxiliary spring structure against excessive stretching.

40. An open clamp according to claim 35, characterized in that the auxiliary spring structure is connected between the end area of the outer band portion and a part of the clamping band means about to pass over into the inner band portion by outwardly extending hook means in the outer band portion and in said part of the clamping band means which are operable to engage in corresponding aperture means provided in the end areas of the leg portions of the auxiliary spring structure.

41. An open clamp according to claim 40, characterized in that the auxiliary spring means is formed by open leaf spring means of at least partly convex shape whose spaced leg portions are provided with said aperture means.

42. An pen clamp according to claim 41, characterized in that the convexly shaped spaced leg portions of the leaf spring means are shaped so as to point toward the top portion of the auxiliary spring means.

43. An open clamp according to claim 42, characterized in that said aperture means are apertures open from the ends of the spaced leg portions.

44. An open clamp according to claim 43, characterized in that said hook means are of generally S-shape pointing away from one another.

45. An open clamp according to claim 44, characterized in that the auxiliary spring means and its interconnection with the end arc of the outer clamping band portion and said part of the clamping band means forms the further means for connecting the overlapping band portions.

46. An open clamp according to claim 45, characterized in that the inner band portion is provided with two circumferentially extending pressed-out rib-like means within at least part of the area of overlap between inner and outer band portions to permit operation of the auxiliary spring structure with a minimum in friction in the installed condition of the clamp.

47. An open clamp structure according to claim 35, characterized in that the auxiliary spring structure includes a cage means formed by the clamping band means and auxiliary spring means accommodated within the cage means.

48. An open clamp according to claim 47, characterized in that the roof-like top portion of the cage means includes substantially rectilinear side portions interconnected by a convexly shaped crown portion and extending in opposite directions from said crow portions, said side portions terminating in at least approximately rectilinear bent-back portions by way of convexly shaped connecting portions, and said bent-back portions passing over into the clamping band means by concavely shaped connecting portions.

49. An open clamp according to claim 48, characterized in that the auxiliary spring means is generally convexly shaped and has spaced leg portions having a width in their end areas less than the width of the clamping band means, and in that the cage mean is provided with slot-like openings of a width at least equal to the width of the end areas of auxiliary spring leg portions so that the auxiliary spring means can extend with the end areas of its leg portions through the slot-like openings and thereby engage the cage means from the outside to elastically oppose an increase of the gap underneath the cage means in the presence of forces seeking to enlarge the diameter of the installed clamp.

* * * * *